(12) United States Patent
Devadoss et al.

(10) Patent No.: US 8,505,009 B2
(45) Date of Patent: Aug. 6, 2013

(54) MANAGING EXCLUSIVE ACCESS TO SYSTEM RESOURCES

(75) Inventors: Madan Gopal Devadoss, Bangalore (IN); Yogesh Sadashiv Deshpande, Bangalore (IN); Panish Ramakrishna, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 126 days.

(21) Appl. No.: 13/020,813

(22) Filed: Feb. 4, 2011

(65) Prior Publication Data

US 2011/0271285 A1    Nov. 3, 2011

(30) Foreign Application Priority Data

Apr. 30, 2010   (IN) .............................. 1210/CHE/2010

(51) Int. Cl.
*G06F 9/46*    (2006.01)

(52) U.S. Cl.
USPC ........................................... 718/100; 711/163

(58) Field of Classification Search
None
See application file for complete search history.

(56) References Cited

U.S. PATENT DOCUMENTS

| | | | |
|---|---|---|---|
| 5,285,528 A | 2/1994 | Hart | |
| 5,742,813 A | 4/1998 | Kavanagh et al. | |
| 6,076,126 A | 6/2000 | Shagam | |
| 6,178,440 B1 | 1/2001 | Foster et al. | |
| 6,772,153 B1 | 8/2004 | Bacon et al. | |
| 7,246,187 B1 * | 7/2007 | Ezra et al. | 710/200 |
| 2003/0149850 A1 * | 8/2003 | Karube | 711/163 |
| 2007/0169002 A1 * | 7/2007 | Kronlund et al. | 717/130 |

* cited by examiner

*Primary Examiner* — Emerson Puente
*Assistant Examiner* — Dong Kim

(57) ABSTRACT

Presented is a method of managing exclusive access to a resource. The method includes determining anticipated wait time, for a task to obtain exclusive access to a resource, and processing the task, depending on the anticipated wait time required to obtain exclusive access to the resource.

8 Claims, 3 Drawing Sheets

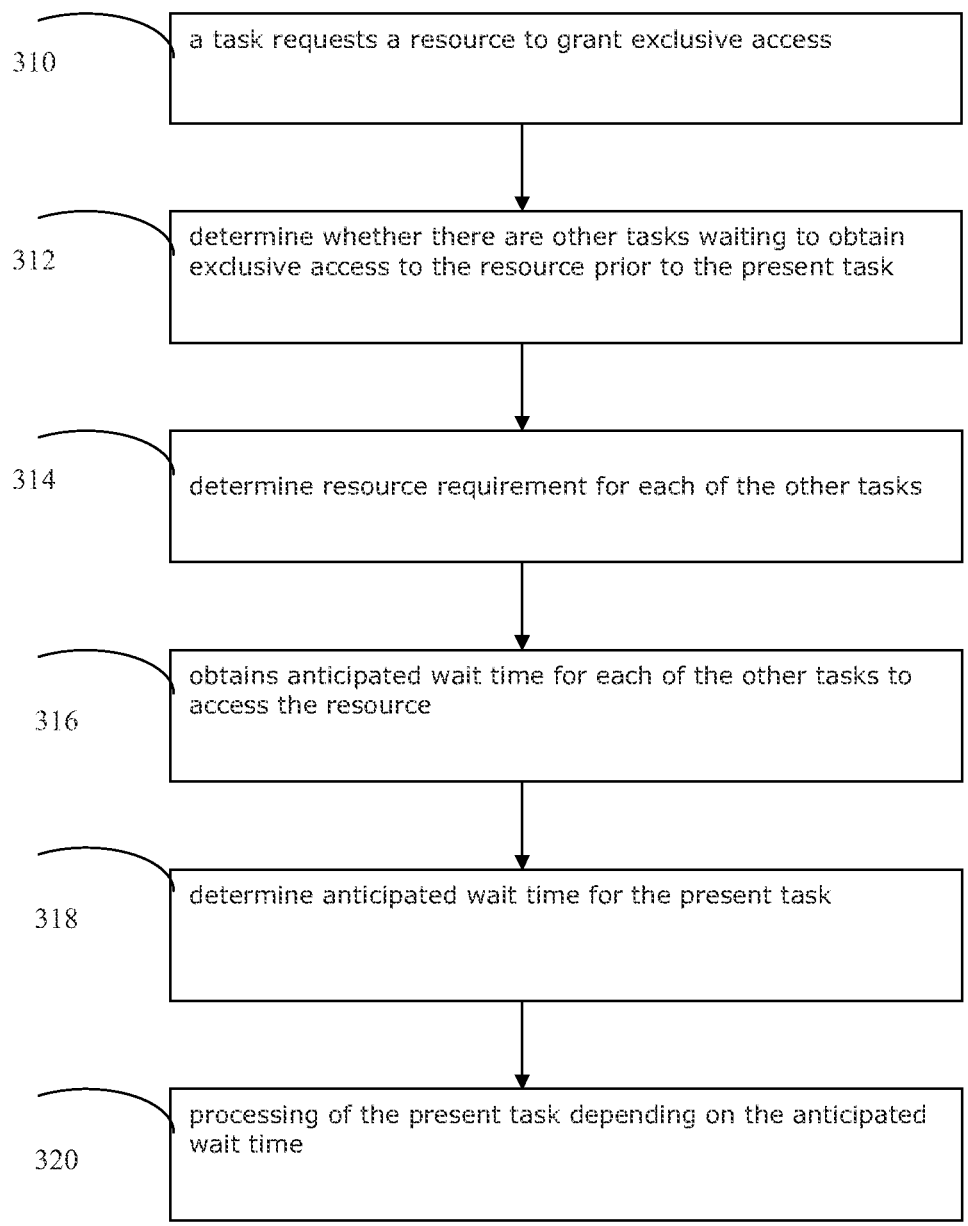
FIG. 3    300

MANAGING EXCLUSIVE ACCESS TO SYSTEM RESOURCES

BACKGROUND

Computing systems have undergone a sea change over the last few decades. Gone are the days when computers were basically used to perform basic tasks such as data entry, word processing, spread sheet preparation, etc. With the advent of faster processors and a plethora of hardware related advances, computers are being used to perform a multitude of high-end tasks, such as, advanced mathematical computation, high end graphics, top of the order gaming and animation, etc. All these tasks, and many others, perform a tremendous amount of demand on a computing device's resources. Be it a standalone personal computer or a multi-processor server computer, resources of each of these systems has to cope with a stream of task requests generated by multiple computer applications that may run on them.

To cope with multiple task requests on a resource, a computing system may provide for queuing of these requests. In this case, each task request would be processed by the resource one by one. There is also the option of allowing a resource to process multiple requests at the same time. However, there may be situations when an exclusive access to a resource may be required by a multiple of tasks. Exclusive access to resources is a common requirement in enterprise computing environments. Obtaining exclusive access to resources that are currently busy involves waiting for the resource in a time bound fashion or making periodic re-tries. This situation may not be desirable in certain cases, for example, when a critical task needs immediate access to a resource.

BRIEF DESCRIPTION OF THE DRAWINGS

For a better understanding of the invention, embodiments will now be described, purely by way of example, with reference to the accompanying drawings, in which:

FIG. 3 shows a flow chart of a computer-implemented method of managing exclusive access to a system resource according to an embodiment.

DETAILED DESCRIPTION OF THE INVENTION

The following terms are used interchangeably through out the document including the accompanying drawings.
(a) "resource" and "system resource"
(b) "task" and "step"

For clarity and convenience, the following definitions are used herein, in the context of an embodiment of the present invention.

The term "stream" refers to a sequence of steps where:
(i) a particular step can be dependent on a parent step (previous step), i.e. child step will not start execution until the parent step completes successfully.
(ii) One or more steps can have the same parent step; in this case the child steps will get executed in parallel.

The term "resource" refers to any part of a computing system or architecture. This includes both physical as well as logical components of a system. Some examples of a system resource may include: system memory, processor(s), storage space, expansion devices, plug-in cards, peripherals, video card, hard drive, system software, application software, utilities, fonts, software components, modules, class components, processes, attributes, functions, drivers, firmware, databases, arrays, data structures, etc. It would be appreciated that the aforesaid list is merely indicative and, in general, any component of a computing system may be treated as a resource for the purpose of this application.

Embodiments of the present invention provide methods, system, computer executable code and computer storage medium for managing exclusive access to system resources.

Figure 1:
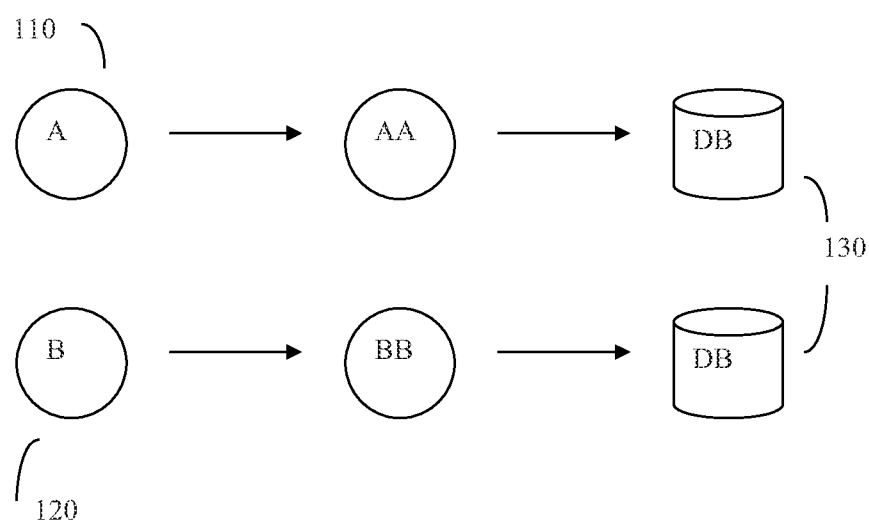
FIG. 1 shows an exemplary block diagram of a sample work flow according to an embodiment.

Embodiments of the present invention aim to provide a method through which wait decision for exclusive access to a resource may be made intelligently based on a close to accurate anticipated wait time for that resource. The absence of knowledge about anticipated wait time, to get exclusive access to a resource, may result in poor decision making in the decision to wait for a resource. FIG. 1 shows an examplary block diagram of a sample work flow according to an embodiment.

Referring to FIG. 1, two parallel work streams 110 and 120 are shown. Both streams want to perform the same task which is to upload data in a resource i.e. database (DB) 130. Stream 110 wants to upload data (AA) that it collects on its way (A to AA) to database 130. Similarly, stream 120 wants to upload data (BB) that it collects on its way (B to BB) to database 130. Both streams may be able to upload their respective data (AA or BB) in database 130, if they access the resource (database) at different times. However, the problem may arise when both streams may want to upload their respective data at the same time and need exclusive access to resource 130. The problem may be further compounded if even larger number of streams running in parallel may need exclusive access to a resource. In such scenario, the system would probably queue up all streams and handle their resource access request one by one. The problem with such solution is that a stream (or task) which is queued up behind has no way of knowing how much time it may need to wait to get exclusive access to a resource. This may result in delay in execution of a critical task and wastage of system resources.

Embodiments of the present inventions aims to obviate the above problems and provide a mechanism whereby access to a resource is efficiently managed and a task gets to obtain a prior knowledge of the anticipated time for it to get access to a resource.

Figure 2:
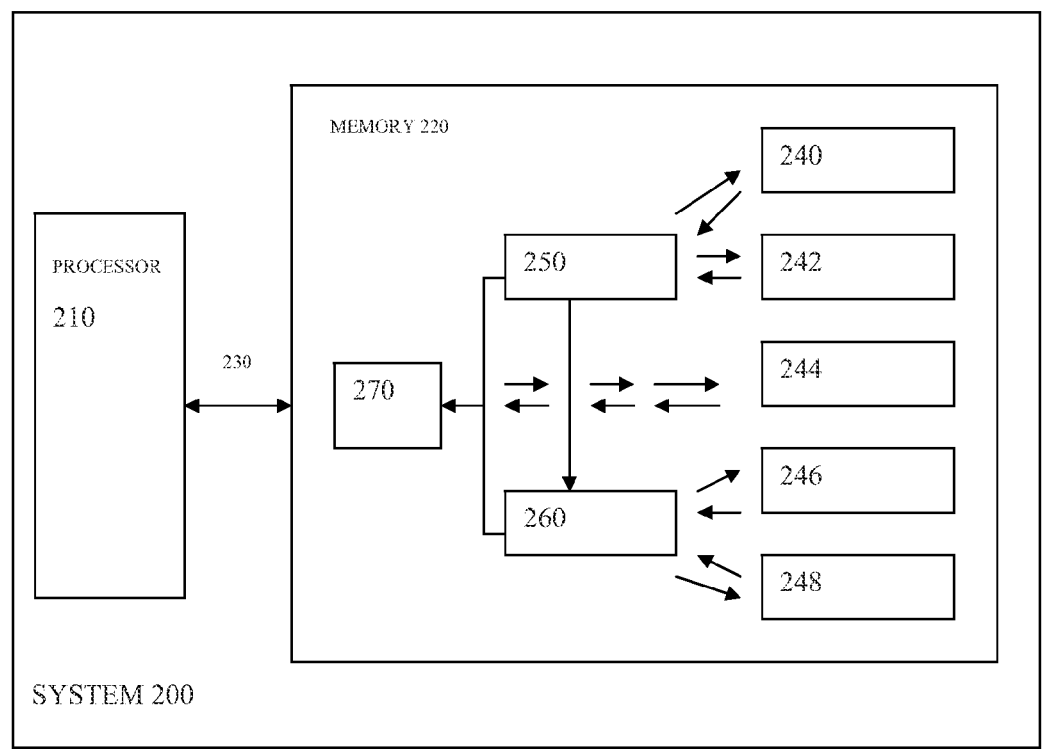
FIG. 2 shows a block diagram of a computing system according to an embodiment.

FIG. 2 shows a block diagram of a computing system according to an embodiment.

The system 200 may be any kind of computing device, such as, but not limited to, a personal computer, a desktop computer, a laptop computer, a notebook computer, a network computer, a personal digital assistant (PDA), a mobile device, a hand-held device, or any other suitable computing. Further, the system 200 may be a standalone system or a network system (such as, but not limited to, a client/server architecture) connected to other computing devices through wired or wireless means.

The system 200 may include a processor 220 and a memory 220. These components may be coupled together through a system bus 230. The memory 220 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc.

The system 200 may include, in memory 220, various components (240, 242, 244, 246, 248, 250, 260 and 270) involved in implementing the method of FIG. 2 (described below) according to an embodiment. These include a Job details database 240, a Job queue database 242, a Job runtime database 244, a Job history database 246, a Job resource database 248, a statistics manager module 250, a resource manager module 260 and a Job controller 270.

The Job details database 240 contains details of all the tasks in all the streams that may run on the computing system 200. The Job details database is like a large repository that contains detailed information regarding various tasks that may run or have run earlier. It may also contain preceding task relationship details. For example, if a task A was involved with a task E in a stream earlier, the Job details database 240 would compile this information.

The Job queue database 242 contains resource specific queues. It provides information on list of tasks waiting for each resource and anticipated wait time for each task. To illustrate, if a resource A has three tasks (x, y and z) waiting for it, the Job queue database 242 would contain information regarding these tasks along with anticipated wait time (let's say, 2 seconds, 4 seconds and 8 seconds, respectively) for each task to obtain exclusive access to resource A.

The Job runtime database 244 contains details of currently running tasks. For example, if x, y and z are the tasks that are currently running, the Job runtime database 244 would contain details about them.

The Job history database 246 contains historical running time and related information of tasks. For example, if a task A has taken an x amount of time to in the past to complete, the Job history database 246 would contain those details. The database may also contain average running time, computed over a number of task completion cycles, for a task.

The Job resource database 248 contains details of resource requirement for each task. To illustrate, if a task A requires L, M and N resources. The Job resource database 248 may contain details of such requirement along with other details, such as, but not limited to, when these resources would be required, how long these resources would be required, how frequently these resources would be required, etc.

The statistics manager module 250 computes and provides average, minimum and maximum anticipated wait time for a task to obtain exclusive access to a resource(s), based on data in Job runtime database 244, Job history database 246 and Job resource database 248.

The resource manager module 260 provides an interface to Job resource database 248.

The job controller 270 controls task execution. It is responsible for queuing up a job for execution and passing the anticipated wait time information for a task to obtain exclusive access to a resource(s).

Embodiments may provide for the creation of a graphical user interface (GUI) that is built over above described Job components (or modules) giving details of waiting jobs and allowing management of a job queue.

It would be appreciated that the system components depicted in FIG. 2 are for the purpose of illustration only and the actual components may vary depending on the computing system and architecture deployed for implementation of the present invention. The various components described above may be hosted on a single computing system or multiple computer systems, including servers, connected together through suitable means.

FIG. 3 shows a flow chart of a computer-implemented method 300 of managing exclusive access to a system resource or a plurality of system resources according to an embodiment. In an embodiment, a task needs to obtain exclusive access to a system resource. The method calculates the anticipated time that may be needed for a task to obtain exclusive access to a system resource and provides various options to the task to manage the waiting period. The method 300 may be performed on a computer system (or a computer readable medium).

The method begins in step 310. In step 310, a task, for example, part of a stream involving multiple tasks, requires exclusive access to a resource. In an embodiment, a plurality of tasks may request exclusive access to a plurality of resources.

In step 312, the method determines whether there are other tasks waiting (for example, in a queue) to obtain exclusive access to the resource prior to the present task identified in step 310. The method may obtain this information by identifying currently running tasks from the Job runtime database and determining resource specific queues from the Job queue database. Both these databases were described earlier.

In step 314, the method determines resource requirement for each of the other tasks that are waiting to obtain exclusive access to the resource prior to the present task. As mentioned earlier, the resource requirement may include details such as when the resource would be required, how long the resource would be required, how frequently the resource would be required, etc. The Job resource database may contain such resource requirement details.

In step 316, the method obtains the anticipated wait time for each of the other tasks which is waiting to obtain exclusive access to the resource prior to the present task. The Job queue database along with Job history database (which contains historical running time information for each task) is used to obtain the anticipated wait time period.

In step 318, the method determines the anticipated wait time for the present task by recognizing the anticipated wait time for each of the other tasks which is waiting to obtain exclusive access to the resource prior to the present task. The method calculates the wait time for the present task by adding the anticipated wait time for each of the other tasks that are in the queue prior to the present task. The statistics manager module computes the average, minimum and maximum anticipated wait time for the present task to obtain exclusive access to the resource.

In step 320, the method determines further processing of the present task depending on the anticipated wait time required to obtain exclusive access to the resource (step 318). The method provides two options to manage the anticipated wait time. In the first case, if the requested resource is not immediately available, the Job controller queues up the present task for execution in future. The Job queue database is updated with the task details and next possible execution times are provided by the statistics manager.

In the second case, the Job controller passes the anticipated wait time to the present task and let the task decide on its next course of action or further process. In this case, the task is not queued up for execution by the controller. Based on the anticipated wait time, the task may make a decision to wait, quit with success status (this may be required, if the next step in the task stream must execute irrespective of current task status) or quit with error status, in case this step is mandatory for success of tasks upstream.

It would be appreciated that the above method steps may not necessarily be performed in the sequence as described above. These steps may be performed in any sequence whatsoever.

A graphical user interface (GUI) may be provided that gives, among other information, details of waiting jobs, thereby allowing management of a job based on the waiting period. The GUI may provide real time information on various components (Job details database 240, Job queue database 242, Job runtime database, Job history database, Job resource database, statistics manager module 250, resource manager module 260 and Job controller 270) and details captured by these components.

It will be appreciated that the described embodiments provide an efficient and effective way of managing anticipated time period when a task is waiting to obtain access to a resource. In providing advance information by way of calculation, as described above, the embodiments provide, with reasonable accuracy, the time at which a job that is waiting for a resource would execute. This may lead to lesser number of processes in waiting state, since some of the task may decide to quit, which otherwise would have been alive and waiting for resources. This obviates running periodic checks on resource availability.

It will be appreciated that the embodiments within the scope of the present invention may be implemented in the form of a computer program product including computer-executable instructions, such as program code, which may be run on any suitable computing environment in conjunction with a suitable operating system, such as, Microsoft Windows, Linux or UNIX operating system. Embodiments within the scope of the present invention may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present invention is for the purpose of illustration only. Although the invention has been described in conjunction with a specific embodiment thereof, those skilled in the art will appreciate that numerous modifications are possible without materially departing from the teachings and advantages of the subject matter described herein. Other substitutions, modifications and changes may be made without departing from the spirit of the present invention.

The invention claimed is:

1. A computer-implemented method of managing exclusive access to a resource, comprising:
  determining anticipated wait time, for a task to obtain exclusive access to the resource, including:
    determining other tasks waiting to obtain exclusive access to the resource;
    determining a resource requirement for each of the other tasks, wherein the determining of the resource requirement includes determining when the resource would be required, how long the resource would be required and how frequently the resource would be required, for each of the other tasks;
    obtaining, for each of the other tasks, the anticipated wait time based on their individual resource requirement; and
    determining the anticipated wait time for the task based on the anticipated wait time for each of the other tasks; and
  processing the task, depending on the anticipated wait time required to obtain exclusive access to the resource, wherein the processing includes passing the anticipated wait time to the task and letting the task determine its next action step, and the next action step includes options of waiting for the resource, quitting with success status, and quitting with errors.

2. A method according to claim 1, wherein the determination of other tasks waiting to obtain exclusive access to the resource comprises identifying currently running tasks.

3. A method according to claim 1, wherein the determination of a resource requirement is obtained from historical running time for each of the other tasks respectively.

4. A method according to claim 1, wherein the processing of the task includes queuing the task for future execution.

5. A method according to claim 1, wherein the determination of anticipated wait time includes determining average, maximum and minimum anticipated wait time of other tasks waiting to obtain exclusive access to the resource.

6. A computing device to manage access to system resources, comprising:
  a processor, wherein the processor is to:
    determine anticipated wait time, for a task to obtain exclusive access to the resource, wherein to determine anticipated wait time, the processor is to:
    determine other tasks waiting to obtain exclusive access to the resource;
    determine a resource requirement for each of the other tasks, including determining when the resource would be required, how long the resource would be required and how frequently the resource would be required, for each of the other tasks;
    obtain, for each of the other tasks, the anticipated wait time based on their individual resource requirement; and
    determine the anticipated wait time for the task based on the anticipated wait time for each of the other tasks; and
  process the task, depending on the anticipated wait time required to obtain exclusive access to the resource, including passing the anticipated wait time to the task and letting the task determine its next action step, wherein the next action step includes one of waiting, quitting the task with a success status, and quitting with an error status.

7. The computing device of claim 6, wherein to determine the anticipated wait time, the processor is to determine average, maximum and minimum anticipated wait time of other tasks waiting to obtain exclusive access to the resource.

8. A non-transitory machine-readable medium comprising instructions to perform a method of managing exclusive access to a resource, the instructions executable on a computer to:
  determine anticipated wait time for a task to obtain exclusive access to the resource, wherein to determine anticipated wait time, the instructions are to:
    determine other tasks waiting to obtain exclusive access to the resource; and
    determine a resource requirement for each of the other tasks, including determining when the resource would be required, how long the resource would be required and how frequently the resource would be required, for each of the other tasks;
    obtain, for each of the other tasks, the anticipated wait time based on their individual resource requirement; and
    determine the anticipated wait time for the task based on the anticipated wait time for each of the other tasks; and
  process the task, depending on the anticipated wait time required to obtain exclusive access to the resource, including passing the anticipated wait time to the task and letting the task determine its next action step, wherein the next action step includes one of waiting, quitting the task with a success status, and quitting with an error status.

* * * * *